(12) United States Patent
Yeh

(10) Patent No.: US 7,416,461 B2
(45) Date of Patent: Aug. 26, 2008

(54) FOAM PRODUCT AND METHOD OF MAKING

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 11/717,631

(22) Filed: Mar. 14, 2007

(65) Prior Publication Data

US 2007/0160798 A1    Jul. 12, 2007

Related U.S. Application Data

(63) Continuation-in-part of application No. 11/271,920, filed on Nov. 14, 2005, now Pat. No. 7,201,625.

(30) Foreign Application Priority Data

Oct. 2, 2006    (TW) ............................... 95136619 A

(51) Int. Cl.
B63B 1/00    (2006.01)
(52) U.S. Cl. ........................................ 441/65; 441/74
(58) Field of Classification Search .................. 441/65, 441/74
See application file for complete search history.

(56) References Cited

U.S. PATENT DOCUMENTS

| | | | | |
|---|---|---|---|---|
| 4,457,729 A | * | 7/1984 | Peerlkamp | ................. 441/74 |
| 4,767,369 A | * | 8/1988 | Snyder | ....................... 441/74 |
| 4,850,913 A | * | 7/1989 | Szabad, Jr. | .................. 441/65 |
| 4,961,715 A | * | 10/1990 | Shanelec | ..................... 441/74 |
| 7,201,112 B2 | * | 4/2007 | Jolley | ......................... 441/65 |

* cited by examiner

Primary Examiner—Lars A Olson
(74) Attorney, Agent, or Firm—Rosenberg, Klein & Lee

(57) ABSTRACT

A foam product and method of making the same is disclosed in this invention. The foam product includes a foam core, at least one skin and a first covering. The foam core is composed of a plurality of foam beads bonded with one another, and comprises a first surface, a second surface, edges and at least one recess defined in the first surface. The skin is disposed in the recess and bonded with the foam core. The first covering is fully bonded to the first surface and edges of the foam core and the skin. Moreover, the method of making the foam product generally comprises the following steps. Firstly, a mold defining a cavity is provided. A first covering is placed in the cavity. At least one skin is provided in a predetermined position on an internal side of the first covering. Then, a suitable quantity of foam beads is introduced in the cavity and steam is injected into the cavity in order to have the foam beads, the first covering and the skin bonded together as a foam product. Finally, the foam product is removed from the cavity.

19 Claims, 11 Drawing Sheets

US 7,416,461 B2

FOAM PRODUCT AND METHOD OF MAKING

CROSS REFERENCE TO RELATED APPLICATION

This is a continuation-in-part application of U.S. application Ser. No. 11/271,920 U.S. Pat. No. 7,201,625, filed on Nov. 14, 2005.

BACKGROUND OF INVENTION

1. Field of Invention

The present invention relates to a foam product and a method for making the same.

2. Related Prior Art

A conventional foam product comprises a foam board (or a foam core) and at least one skin. The foam board is made of foam materials. The skin is bonded to the foam board via a bonding medium.

Taiwan Patent No. M269181 discloses a multilayer composite board that comprises a foam layer coated with a rigid plastic layer thereon via an extrusion coating process. In addition, Taiwan Patent No. 580424 discloses a method for making a wearproof solid foam article by bonding a patterned outer film to a foam body. Moreover, Taiwan Patent No. I244978 discloses a method for forming a soft mat and a hard plate in one piece by using a lot of molds.

In U.S. Pat. Nos. 5,658,179 and 4,850,913, a sports board comprises a foam core and film/foam sheet laminate covering the foam core. The foam core is composed of foam materials and shaped into a predetermined figure. The laminate is heat-laminated all the surfaces of the foam core. U.S. Pat. No. 5,211,593 discloses a foam-core structure with a graphics-imprinted skin. The foam-core structure and the method for making the same are similar with those of the patents mentioned above, but more complicated. U.S. Pat. No. 4,693,856 discloses a method for the preparation of foamed thermoplastic articles from a plurality of synthetic resinous particles. The method comprises the steps of providing synthetic resinous particles, introducing into the particles an expanding agent, disposing the particles within a mold, and introducing a hot steam to cause the particles to expand and adhere to one another.

SUMMARY OF INVENTION

The primary object of this invention is therefore to provide a foam product and a method for making the same.

According to the present invention, a foam product includes a foam core, at least one skin and a first covering. The foam core is composed of a plurality of foam beads bonded with one another, and comprises a first surface, a second surface, edges and at least one recess defined in the first surface. The skin is disposed in the recess and bonded with the foam core. The first covering is fully bonded to the first surface and edges of the foam core and the skin. Furthermore, the first covering comprises visible patterns.

The method of the present invention generally comprises the following steps. Firstly, a mold defining a cavity is provided. A first covering is placed in the cavity. At least one skin is provided in a predetermined position on an internal side of the first covering. Then, a suitable quantity of foam beads is introduced in the cavity and steam is injected into the cavity in order to have the foam beads, the first covering and the skin bonded together as a foam product. Finally, the foam product is removed from the cavity. Accordingly, the foam product comprises the first covering, the skin and a foam surface.

Further benefits and advantages of the present invention will become clear as the description proceeds.

BRIEF DESCRIPTION OF DRAWINGS

The invention will now be elucidated with reference to the following description and accompanying drawings where.

DETAILED DESCRIPTION OF EMBODIMENTS

Figure 1:
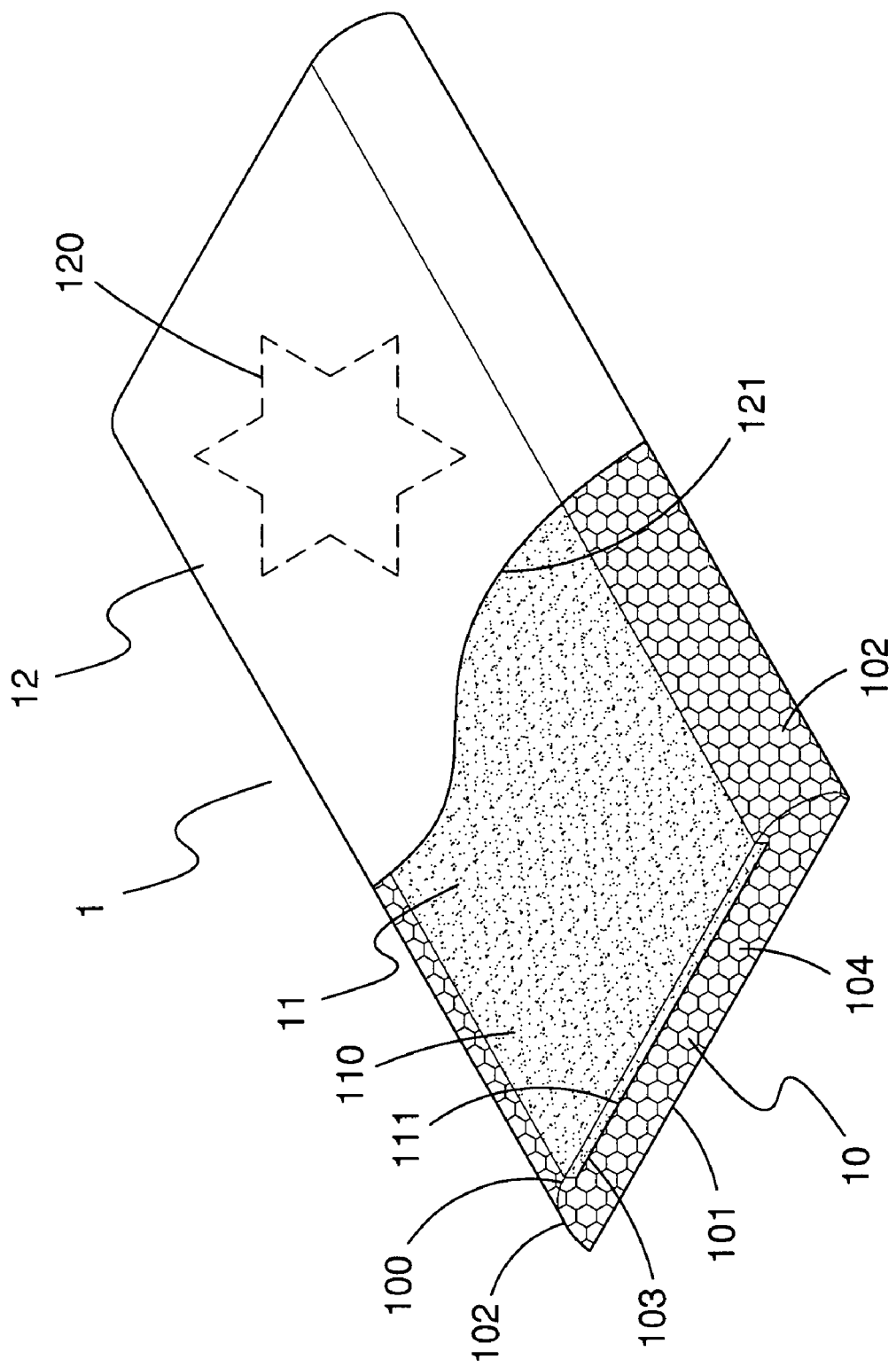
FIG. 1 is a cut-away view of a foam product according to a first embodiment of the present invention.

With reference to FIG. 1, description will be given of a foam product 1 according to a first embodiment of this invention.

The foam product 1 comprises a first foam core 10, at least one skin 11 and a first covering 12. The first foam core 10 is composed of a plurality of foam beads 104 bonded with one another tightly. The first foam core comprises a first surface 100, a second surface 101 opposite to the first surface 100, and edges 102. In addition, the first foam core 10 defines at least one recess 103 in the first surface 100. The skin 11 is disposed in the recess 103 of the first foam core 10 and bonded with the first foam core 10. The first covering 12 is fully bonded to the first surface 100, the edges 102 and the skin 11 and further comprises visible patterns 120. In the present invention, the first covering 12 could be a mono-layer plastic film having a patterned side facing the first foam core 10 or a composite multi-layer plastic film having the patterns 120 printed within and having a thickness in a range of 0.03 to 1.5 mm. Furthermore, the first covering 12 may be colored so as to become a plastic film with a color ground. Preferably, the first covering 12 has a thickness in the range of 0.03 to 0.1 mm, and the thickness is adjustable according to different applications of the present invention.

The foam beads 104 are made of foam particles, such as polypropylene (PP), polyethylene (PE), polystyrene (PS) or the like, and those foam beads 104 are pre-foamed. The skin 11 comprises at least one foam layer 110 with a density in a range of 1.5 to 12 pcf and a thickness in a range of 1 to 25 mm. The density of the foam layer 110 is greater than that of the first foam core 10 so that the foam product 1 is more tactile and even. Similarly, the foam layer 110 can be made of PE, PP, PS, thermoplastic polyurethane elastomer (TPU) or the like. Preferably, the foam layer 110 is made of materials selected from those with physical-chemical characteristics similar to those of the foam beads 104 of the first foam core 10.

In the first embodiment, the foam product 1 can be applied for many applications, such as sports goods, recreational equipments, cushion, etc. For instance, the foam product 1 can be used in sports goods, e.g. a snowboard, a sailboard or a slider, and it would need another foam product to be engaged with so as to protect the revealed second surface 101 of the first foam core 10. Otherwise, the foam product 1 can be directly applied to other cushion, e.g. a bicycle saddle or a luggage cushion, despite the revealed second surface 101 of the first foam core 10.

Furthermore, the skin 11 can protect the first foam core 10 from excessive stress and distortion over a long period of time so that the foam product 1 is strong and endurable. Since the skin 11 is disposed in the recess 103 and bonded with the first foam core 10, and also is covered by and bonded with the first covering 12, there is no room for the skin 11 to move. Hence, when the foam product 1 is applied for a skateboard or a slider, the skin 11 can be disposed on the first surface 100 of the first foam core 10 where a user sits.

In order to enhance the bonding between the first foam core 10, the skin 11 and the first covering 12, a first bonding film 121 can be either applied to a contact side of the first covering 12 or to the first surface 100 and edges 102 of the first foam core 10 and a side of the skin 11. Preferably, the first bonding film 121 is formed on the contact side of the first covering 12 for bonding the first covering 12 to the first surface 100 and edges 102 of the first foam core 10. The skin 11 can further comprise an additional bonding film 111 for bonding the first foam layer 110 to the first foam core 10. In particular, materials of the bonding films are selected according to those of the foam beads 104 of the first foam core 10. In addition, the bonding films 111, 121 are made of the materials with excellent bonding ability to the foam beads 104 and the first foam layer 110, such as a multi-property copolymer mixed with PE, PS or the like.

Figure 2:
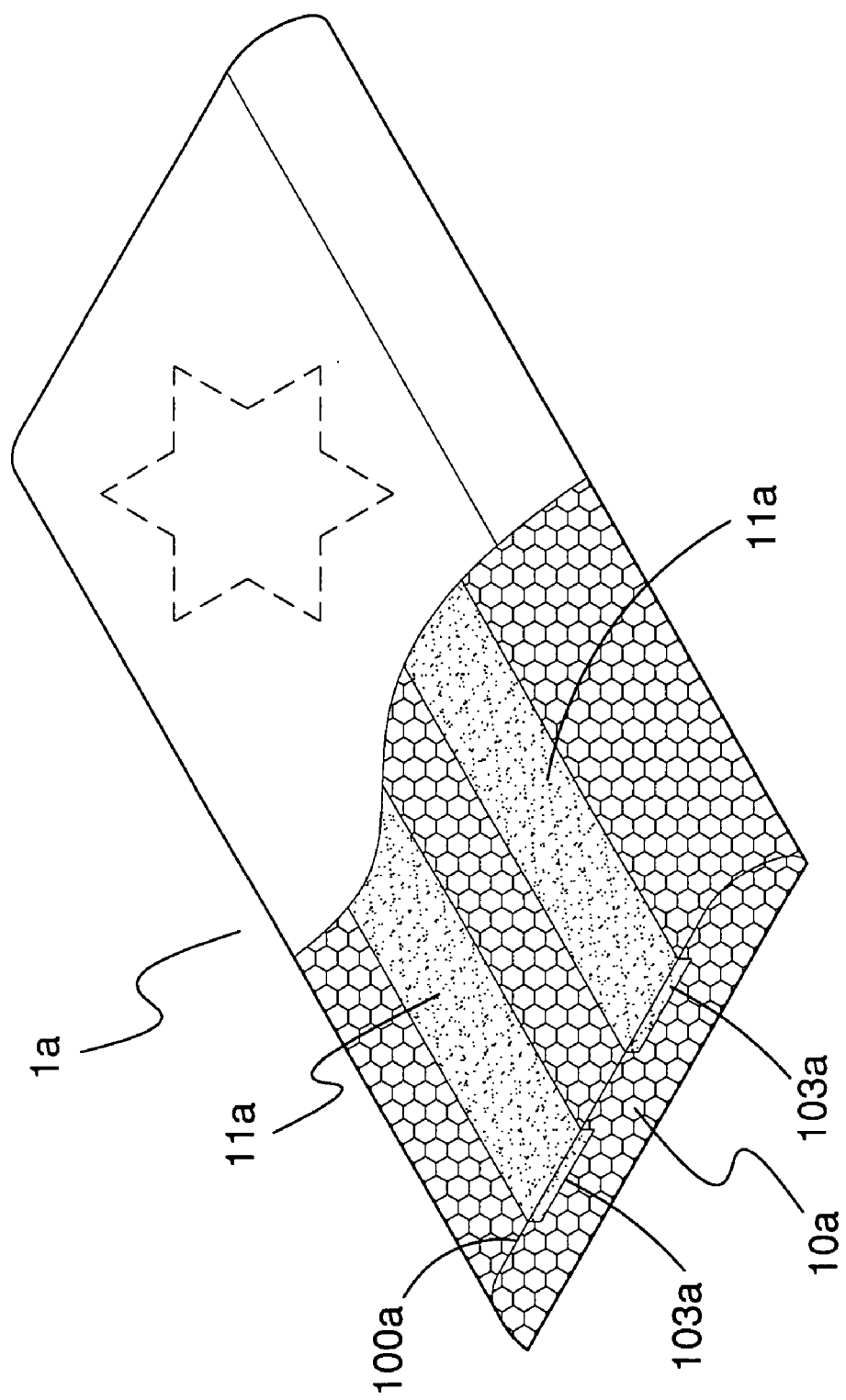
FIG. 2 is a cut-away view of a foam product according to a second embodiment of the present invention.

With reference to FIG. 2, a foam product 1a according to a second embodiment of this invention is similar to the foam product 1 in FIG. 1 except that the foam product 1a comprises two skins 11a in two recess 103a defined in a first surface 100a of a first foam core 10a.

Referring to FIGS. 1 and 2, the skins 11 and 11a of the present invention can be located in any suitable position on the first surfaces 100 and 100a of the first foam cores 10 and 10a. The preferred position is where the foam product will be exerted or pressed. For example, if the foam product 1a is used in a boat or a canoe. The skins 11a may need to be placed in predetermined positions so as to match up with the body of the boat or the body of the canoe.

Figure 3:
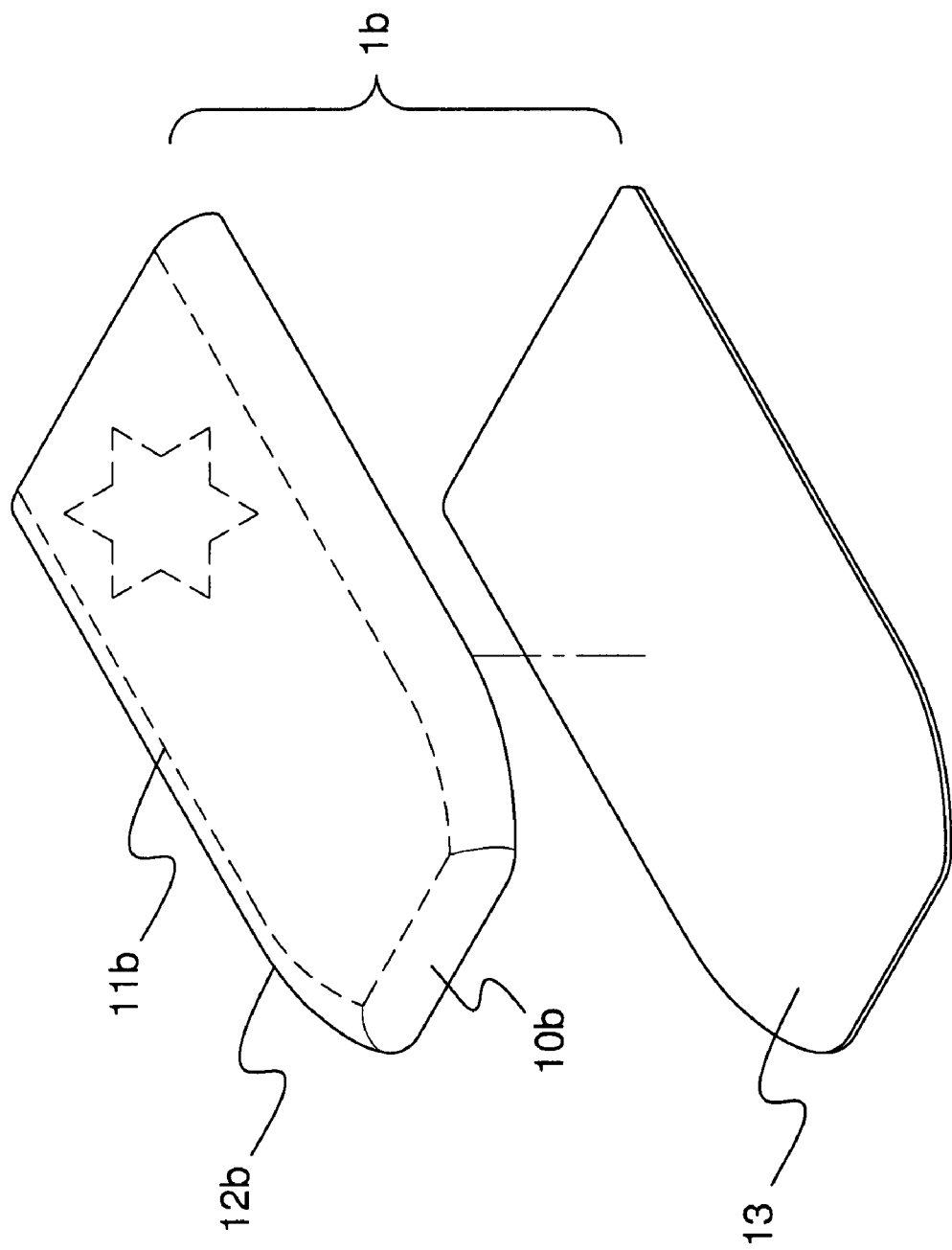
FIG. 3 is an exploded view of a foam product comprising a second covering according to a third embodiment of the present invention.

With reference to FIG. 3, a foam product 1b according to a third embodiment of this invention is similar to the foam product 1 in FIG. 1 except including a second covering 13 bonded to a revealed surface of a first foam core 10b thereof. Therefore, the first foam core 10b with a skin 11b can be fully covered and protected by a first covering 12b and the second covering 13 so as to prolong its lifespan. The foam product 1b can be used as a sports board or a slider. Since the foam product 1b is used for sliding against a surface, such as water surface, snow-covered ground or dry ground, the second covering 13 is provided for protecting the revealed surface of the first foam core 10b.

Figure 4:
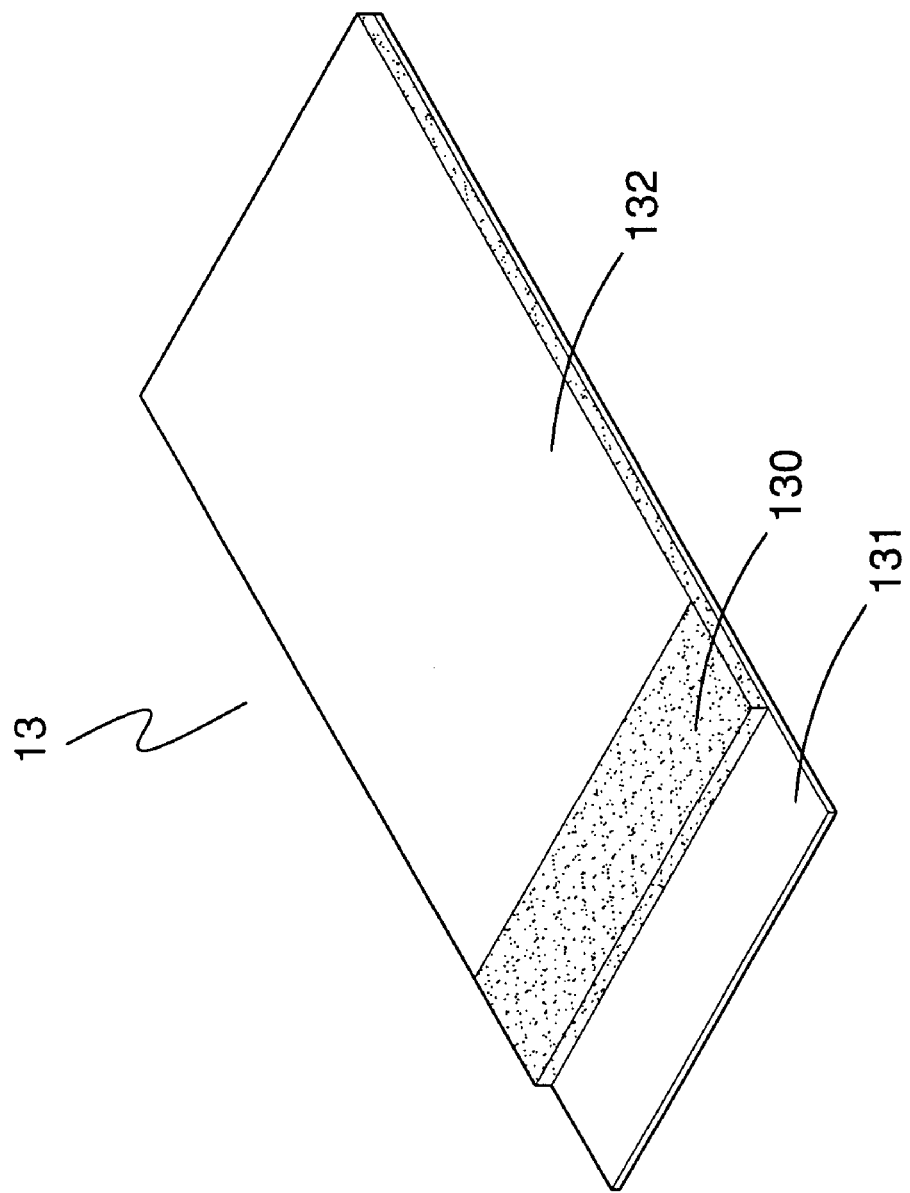
FIG. 4 is a cut-away view of an embodiment of the second covering.

Referring first to FIG. 4, an embodiment of the second covering 13 comprises a second foam layer 130, a plastic plate 131, and a second bonding film 132. The second foam layer 130 is provided for bonding to the above referred revealed surface of the first foam core. Preferably, the second foam layer 130 has a density in the range of 1.5 to 12 pcf and a thickness in the range of 1 to 25 mm. The plastic plate 131 is bonded to the second foam layer 130. The second bonding film 132, as similar to the above descriptions, is provided for bonding the second foam layer 130 of the second covering 13 to the revealed surface of the first foam core. The second foam layer 130 is made of a material selected from PE, PP, PS, TPU or the like. The plastic plate 131 is made of wearproof materials. Preferably, the plastic plate 131 has a thickness in a range of 0.1 to 1 mm, and the thickness is adjustable according to different applications of the present invention.

Figure 5:
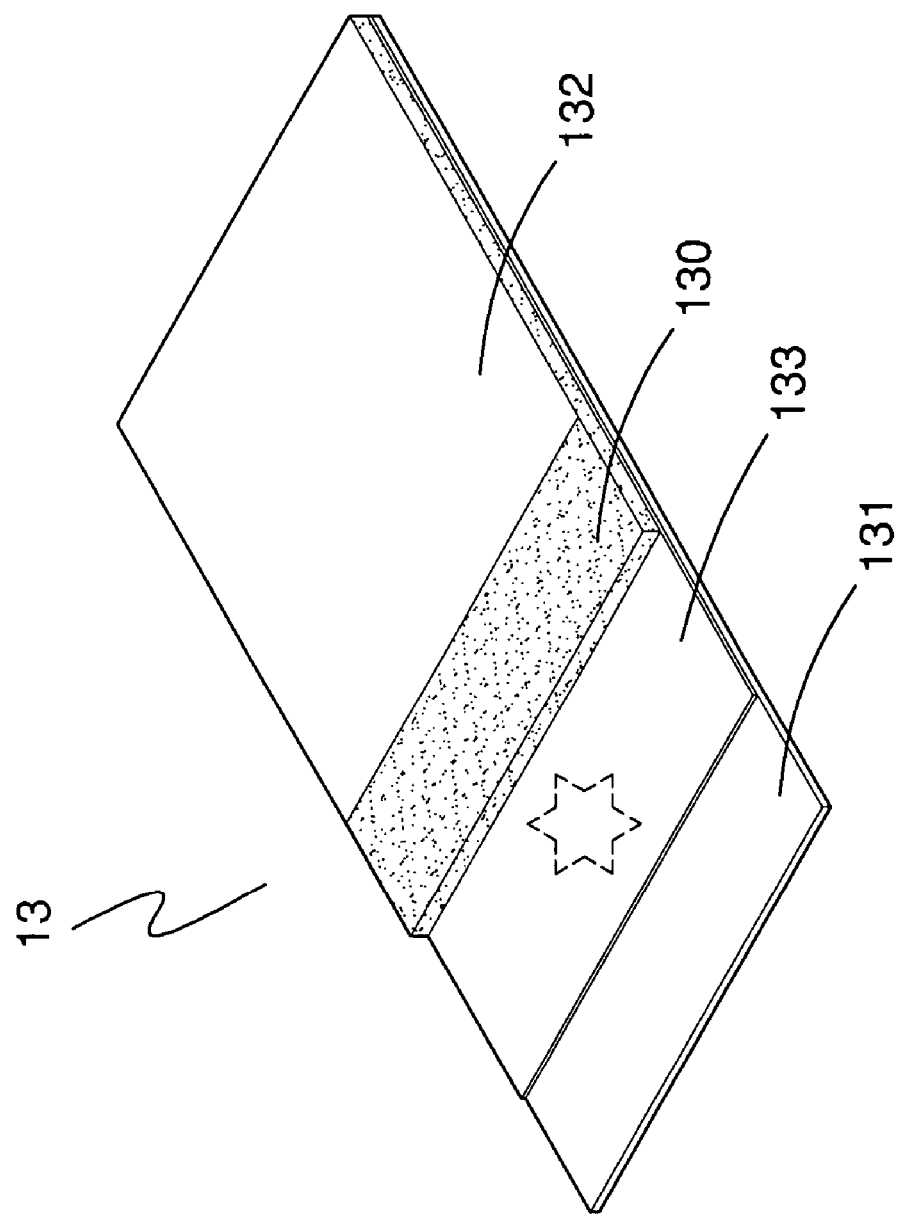
FIG. 5 is a cut-away view of another embodiment of the second covering.

Referring to FIG. 5, in addition to the second foam layer 130, the plastic plate 131 and the second bonding film 132 of FIG. 4, another embodiment of the second covering 13 further comprises a second plastic film 133 interposed between the second foam layer 130 and the plastic plate 131. Similar to the first covering 12 and 12a, as illustrated above, the second plastic film 133 could be a mono-layer film or a multi-layer film and comprises patterns visible from the outside of the plastic plate 131.

Figure 6:
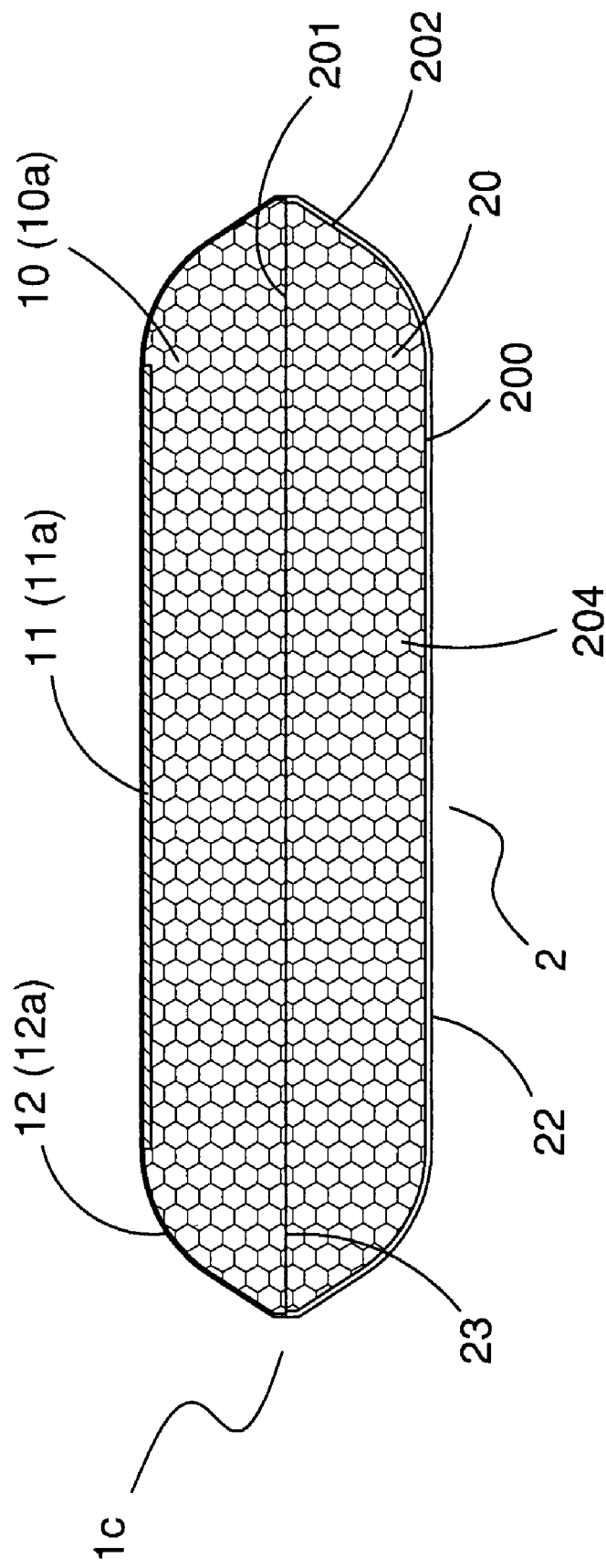
FIG. 6 is a cross-sectional view of a foam product comprising two foam cores according to a fourth embodiment of the present invention.

With reference to FIG. 6, a foam product 1c according to a fourth embodiment of this invention is similar to the above foam product 1, 1a and comprises the first foam core 10, 10a, the skin 11, 11a and the first covering 12, 12a as shown in FIGS. 1 and 2, except further comprising a foam structure 2 bonded to the revealed second surface 101 of the first foam core 10. The foam structure 2 comprises a second foam core 20 comprising a first surface 200, a second surface 201 opposite to the first surface 200 and edges 202. The second surface 201 of the second foam core 20 is bonded to the second surface of the first foam core 10, 10a. The second foam core 20 is composed of a plurality of foam beads 204 bonded to one another compactly. The material of the foam beads 204 of the second foam core 20 is the same as the material mentioned above, such as PP, PE, PS or the like.

Moreover, the foam product 1c further comprises a second covering 22, such a plastic film or a plastic plate described above. The second covering 22 is bonded to the first surface 200 and edges 202 of the second foam core 20, and joined to the first covering 12, 12a. The second covering 22 can further comprise patterns therein, similar to the first covering 12, 12a, and be made of wearproof materials for different applications. Preferably, the second covering 22 has a thickness in a range of 0.03 to 1.5 mm. In addition, a bonding film 23 is further provided for bonding the second surface 201 of the second foam core 20 to the second surface of the first foam core 10 and 10a.

Figure 7:
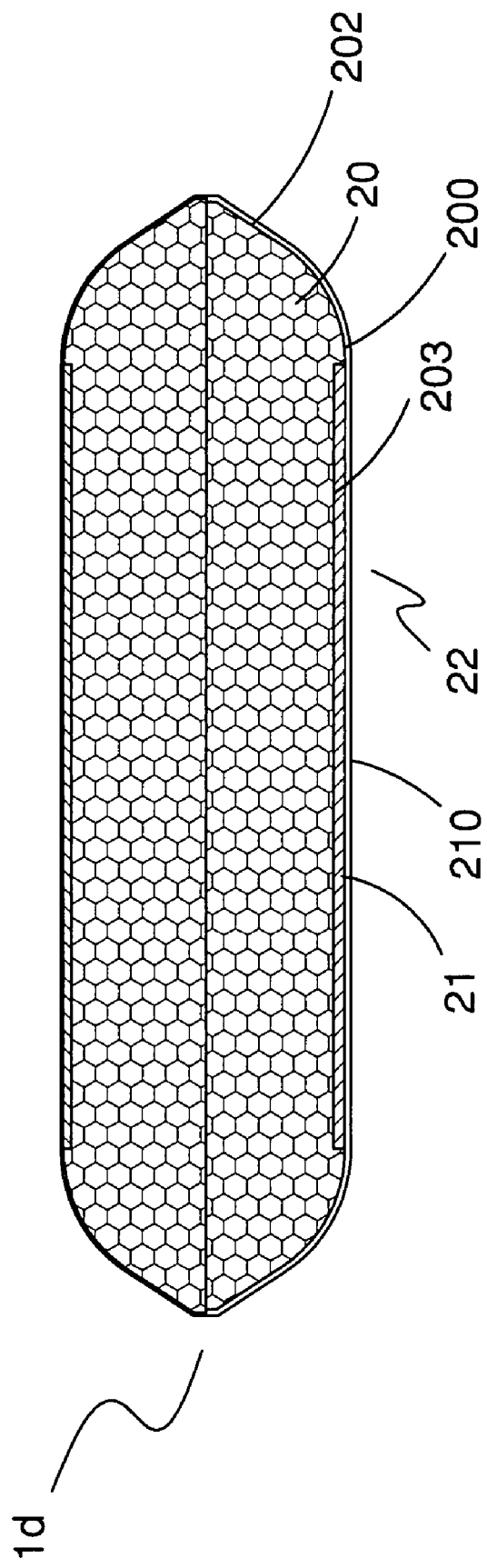
FIG. 7 is a cross-sectional view of a foam product according to a fifth embodiment of the present invention.

FIG. 7 shows a foam product 1d according to a fifth embodiment of this invention. The foam product 1d is similar to the foam product 1c and comprises the second foam core 20 and the second covering 22 bonded to the first surface 200 and edges 202 of the second foam core 20, except the second covering 22 further comprising a second foam layer 21 disposed in a concavity 203 defined in the first surface 200 and bonded to the second foam core 20, and a plastic plate 210 bonded to and covered the second foam layer 21. Substantially, the second foam layer 21 and the plastic plate 210 are similar to those disclosed above.

Figure 8:
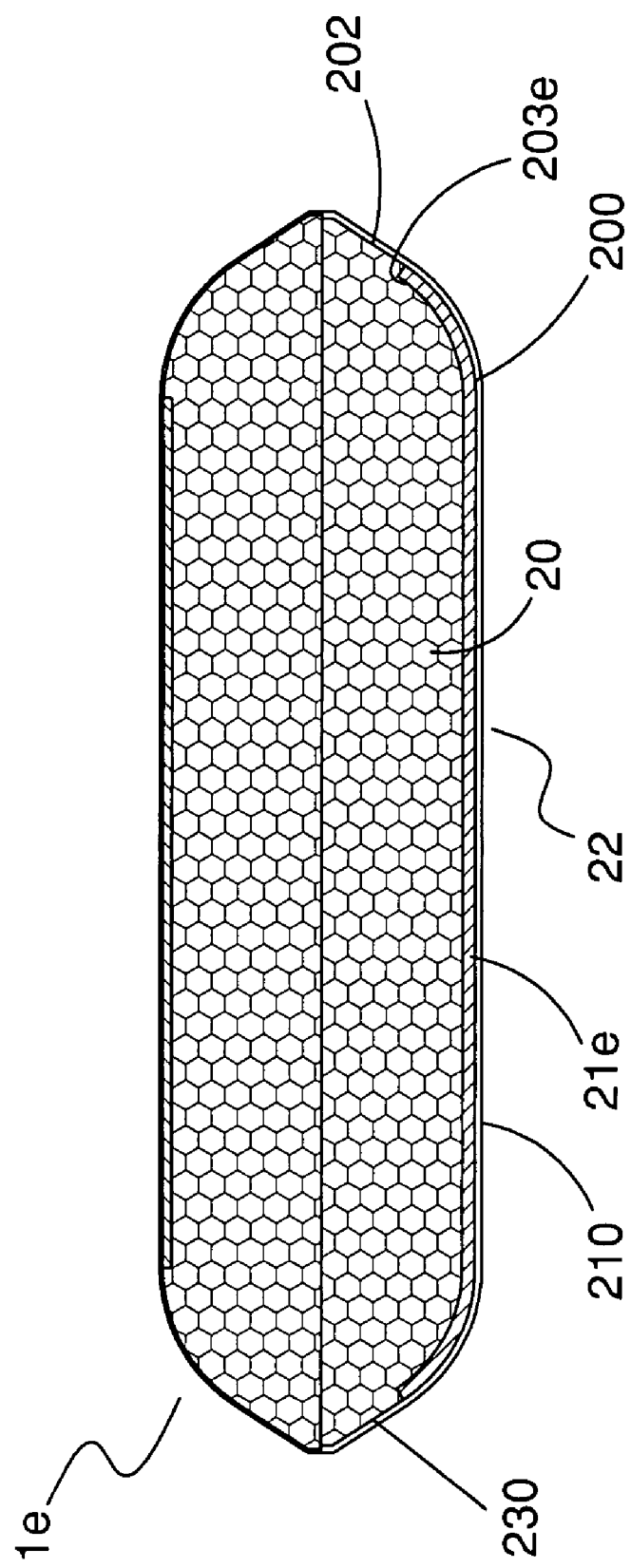
FIG. 8 is a cross-sectional view of a foam product according to a sixth embodiment of the present invention.

FIG. 8 shows a foam product 1e according to a sixth embodiment of this invention. The foam product 1e is similar to the foam product 1d and comprises the second foam core 20 and the second covering 22 except a second foam layer 21e disposed in a concavity 203e defined in the first surface 200 being further extended to the edges 202 of the second foam core 20.

In the fourth, fifth and sixth embodiments, an additional bonding film 230 can be applied for bonding the second covering 22, such as the plastic plate 210, to the first surface 200, the edges 202 of the second foam core 20.

In other words, each of the fourth, fifth and sixth embodiments is made optionally by combining two foam products of the first or second embodiment. It is noted here that the fourth, fifth and sixth embodiments are not limited to bond the foam structure 2 to the second surface of the first foam core 10, 10a, as shown in the figures. For instance, the foam structure 2 may be bonded partially in relation to the second surface of the first foam core.

Figure 9:
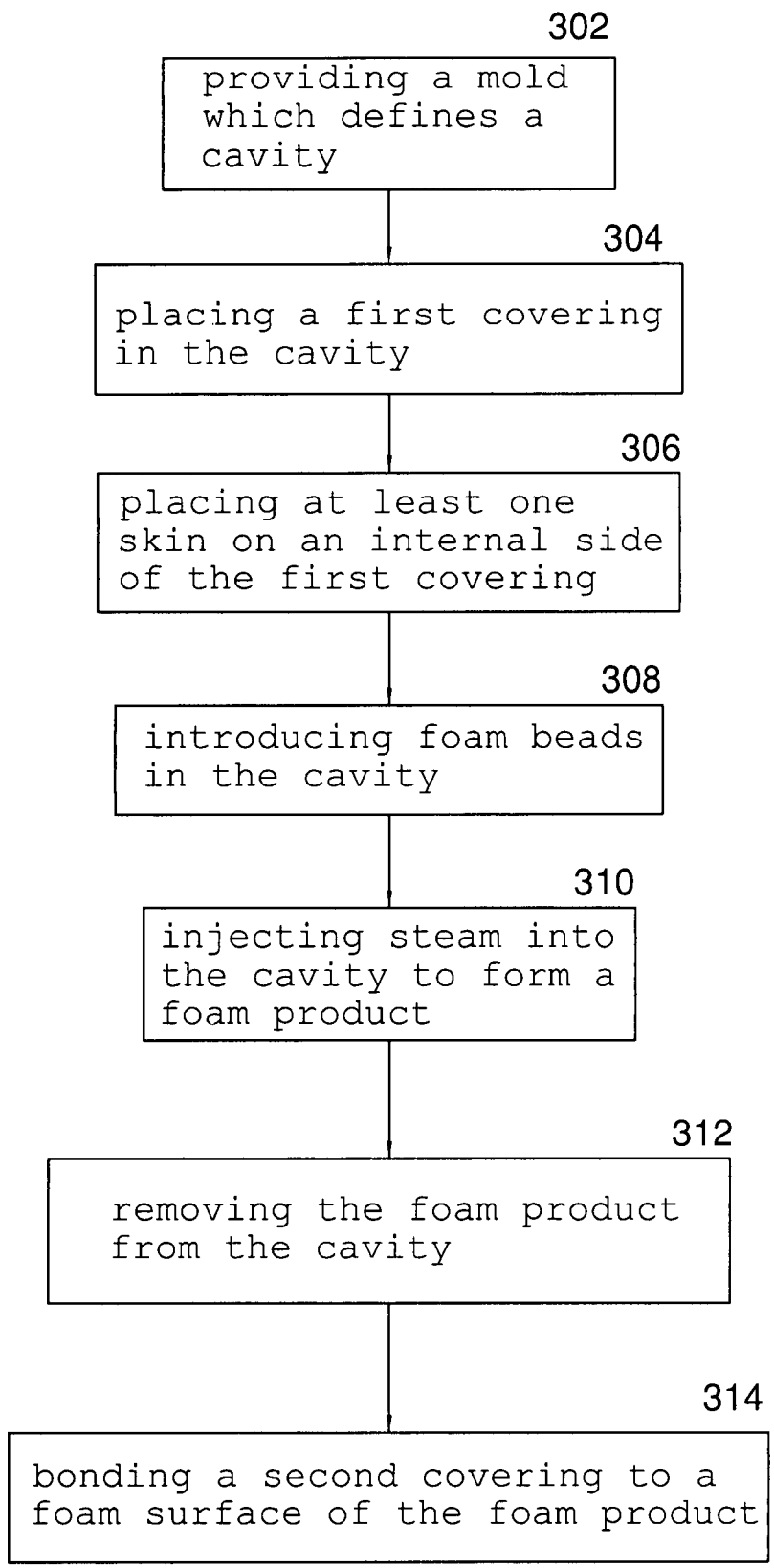
FIG. 9 is a flowchart of a method for making a foam product according to the present invention.

FIG. 9 is a flowchart of a method for making the foam product according to the preferred embodiment of the present invention.

In block 302, a mold is provided. The mold defines a cavity and includes an upper half and a lower half. The cavity is shaped according to the shape of a desired foam product. The upper half connects with an injection device. The injection device includes a hopper and a steam supplier both connected to the upper half via a first pipe and a second pipe respectively. The hopper is provided for introducing the foam beads, such as the foam beads made of PP, PE, PS or the like, which are needed in the following steps, as will be illustrated later. The steam supplier is provided for supplying steam with particular pressure and temperature to the mold.

In block 304, a first covering is placed in the cavity. The first covering is preferably big enough to cover the cavity and secured in the mold. For instance, the first covering is placed on the lower half, and then the upper and lower halves are engaged to secure the first covering in the mold.

In block 306, at least one skin with suitable dimensions is placed at a predetermined position on an internal side of the first covering.

In block 308, a suitable quantity of foam beads is introduced in the cavity. In other words, the foam beads are introduced into the cavity by actuating the injection device via the first pipe.

In block 310, steam is injected into the cavity in order to have the foam beads, the first covering and the skin bonded together so as to form a foam product. In other words, steam is suitably injected from the steam supplier into the cavity of the mold via the second pipe so that the foam beads are heat-expanded slightly and peripheries of the foam beads are fused to heat-bond with one another compactly. When the foam beads are expanding and bonding, the first covering and the skin are both accordingly bonded to the foam beads as well.

In block 312, the foam product is removed from the cavity. Herewith, the foam product comprises the first covering, the skin and a foam surface. The foam beads are shaped correspondingly to the cavity to become a foam core partly bonded with the first covering and the skin. The portion of the foam core without the first covering and the skin is defined as the foam surface or the revealed surface of the foam core.

Accordingly, the foam products 1, 1a in FIGS. 1 and 2 can be made through the method disclosed above. Additionally, the method can further comprise the following step. In block 314, a second covering is bonded to the foam surface through a lamination process, such as a heat-lamination. After the bonding of the second covering, the foam product 1b in FIG. 3 is finished. Alternatively, an additional foam core, namely the second foam core 20 in FIGS. 6-7, can be bonded to the foam surface accordingly the different application to the present invention.

Figure 10:
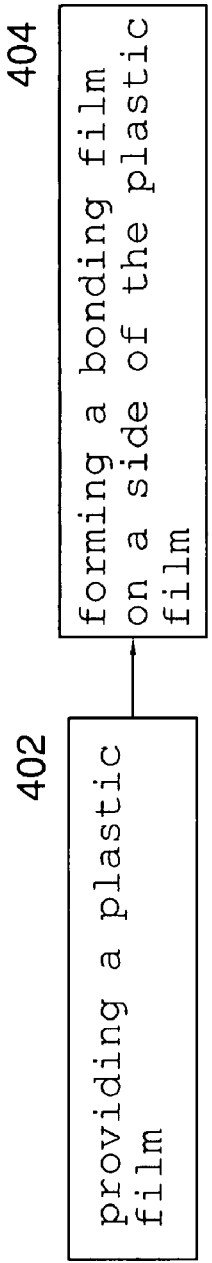
FIG. 10 is a flowchart of a method for making a first covering according to the present invention.

The following description refers to an example of a method for making the first covering of the present invention with reference to FIG. 10. Firstly, a plastic film is provided, as shown in block 402. Then, a bonding film is formed on a side of the plastic film, as shown in block 404. The bonding film can enhance the bonding ability between the plastic film and the foam beads. In practice, a transparent or a translucent plastic film printed with or without patterns or colors is provided in advance, and a bonding film is extruded with a thickness about 0.01 to 0.1 mm on the side of the plastic film. The characteristics of the bonding film are illustrated above.

Figure 11:
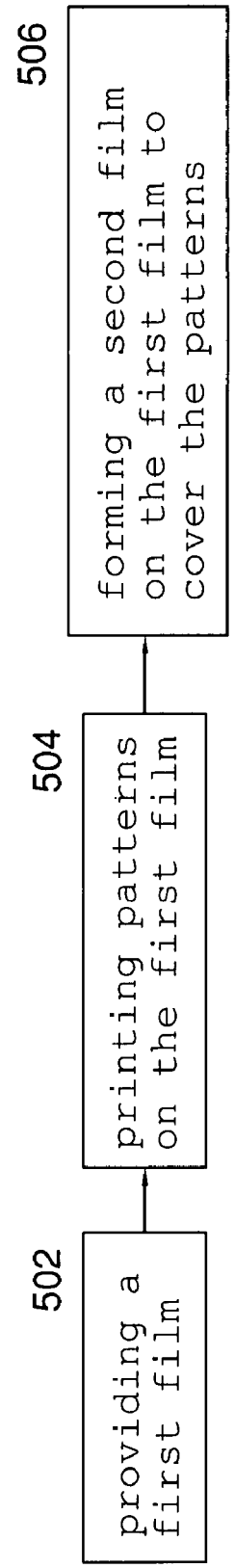
FIG. 11 is a flowchart of a method for making a patterned plastic film according to the present invention.

The method of making the plastic film with visible patterns will now be described in more detail with reference to FIG. 11. Firstly, a first film is provided in block 502. Then, the first film is printed with the patterns in block 504. Subsequently, a second film is formed on the first film by extrusion or lamination to cover the patterns in block 506. In other words, the patterns are sandwiched in between the first and second films.

Figure 12:
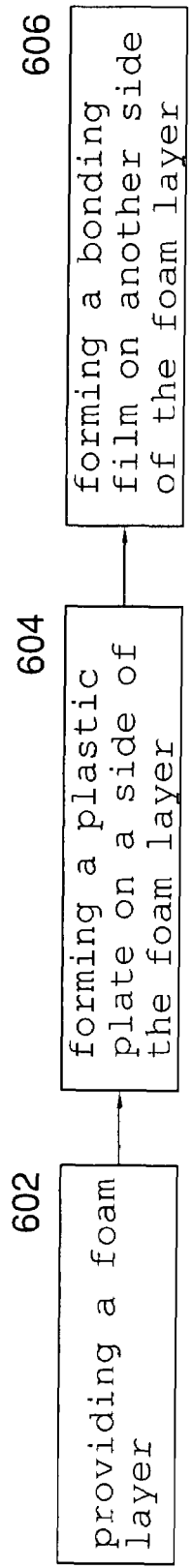
FIG. 12 is a flowchart of a method for making a second covering of FIG. 4 according to the present invention.

FIG. 12 shows a method for making the second covering of FIG. 4. There is provided a foam layer in block 602 with a density in the range of 1.5 to 12 pcf and a thickness in the range of 1 to 25 mm. A plastic plate is formed on a side of the foam layer in block 604. A bonding film is formed on another side of the foam layer in block 606 for bonding the foam layer to the foam surface of the foam product. It is noted that the bonding film and the plastic plate are respectively formed on the opposite sides of the foam layer by extrusion or lamination.

Figure 13:
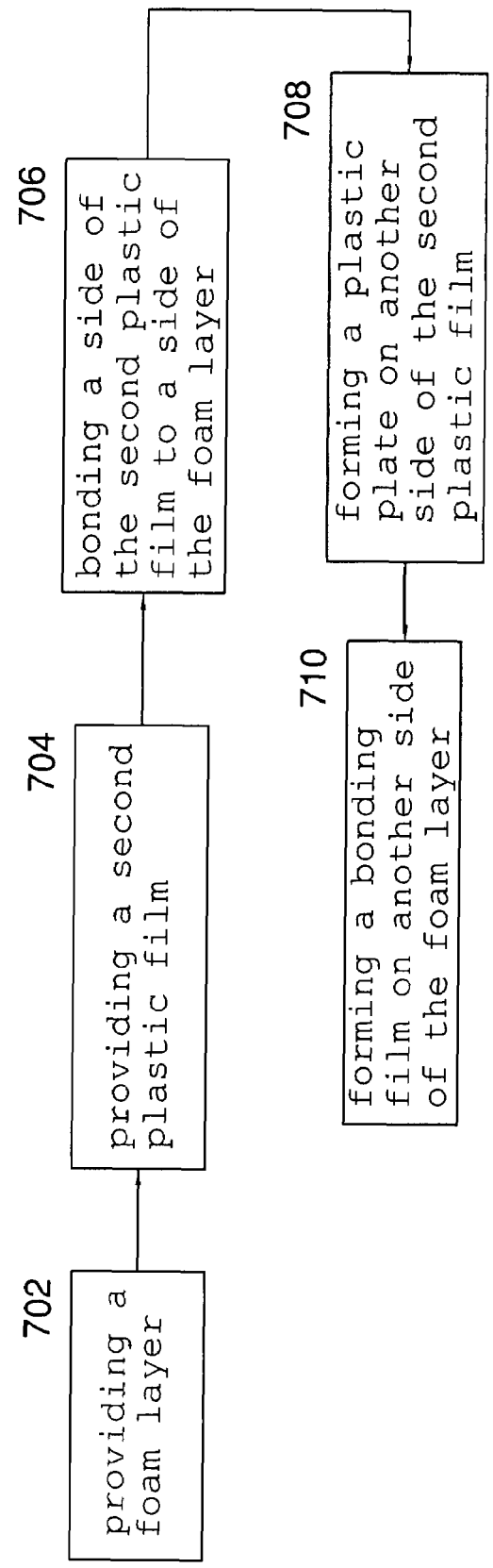
FIG. 13 is a flowchart of a method for making a second covering of FIG. 5 according to the present invention.

FIG. 13 shows a method for making the second covering of FIG. 5. There is provided a foam layer in block 702 with a density in the range of 1.5 to 12 pcf and a thickness in the range of 1 to 25 mm. There is provided a second plastic film which comprises patterns in block 704. A side of the second plastic film is bonded to a side of the foam layer in block 706. A plastic plate is formed on another side of the second plastic film in block 708, wherein the plastic plate is thicker than the second plastic film. A bonding film is provided on another side of the foam layer in block 710 for bonding the foam layer to the foam surface of the foam product. Similarly, the bonding film and the plastic plate are respectively formed on the foam layer by extrusion or lamination.

As disclosed above, the present invention exhibits advantages of easy production and a low cost because the foam core, the skin and the first covering of the foam product are integrally and securely formed at one time by using the mold. The skin, the first covering and the first foam core of the present invention are tightly bonded together by the bonding films. Moreover, the foam product of the present invention exhibits advantages of light in weight because of the foam beads of which the foam core is composed. As for the skin, the first covering and the second covering, those are provided for enhancing the foam core and prolonging its lifespan. In addition, the foam products comprising printed patterns or stereo patterns may enhance their competitive advantages. In particular, the method is simple and efficient.

Numerous characteristics and advantages of the invention have been set forth in the foregoing description. The disclosure, however, is illustrative only, and changes may be made in detail within the principle of the invention, to the full extent indicated by the broad general meaning of the terms in which the appended claims are expressed.

The invention claimed is:

1. A foam product comprising:
   a first foam core having a first surface and a second surface opposite to the first surface, defining a recess in the first surface, and being composed of a plurality of foam beads;
   a skin disposed in the recess and bonded to the first foam core;
   a first covering bonded to the first surface of the first foam core and the skin; and
   a second foam core bonded to the second surface of the first foam core.

2. The foam product of claim 1, wherein the skin comprises at least one first foam layer having a density in a range of 1.5 to 12 pcf and a thickness in a range of 1 to 25 mm.

3. The foam product of claim 2, comprising a second covering bonded to the second foam core.

4. The foam product of claim 3, wherein the second covering comprises:
   a second foam layer bonded to the second foam core; and
   a plastic plate bonded to the second foam layer.

5. The foam product of claim 4, wherein the first covering and the plastic plate comprise patterns respectively.

6. The foam product of claim 1, comprising a first bonding film for bonding the first covering to the first surface of the first foam core and the skin, and comprising a second bonding film for bonding the second foam core to the second surface of the first foam core.

7. The foam product of claim 6, wherein the first covering comprises patterns.

8. A foam product comprising:
   a first foam core having a first surface and a second surface opposite to the first surface, defining a recess in the first surface, and being composed of a plurality of foam beads;
   a skin made of a first foam layer, disposed in the recess and bonded to the first foam core;
   a first covering bonded to the first surface of the first foam core and the skin; and
   a first bonding film for bonding the first covering to the first surface of the first foam core and the skin.

9. The foam product of claim 8 comprising:
   a second covering bonded to the second surface of the first foam core; and
   a second bonding film for bonding the second covering to the second surface of the first foam core.

10. The foam product of claim 9, wherein the second covering comprises:
    a second foam layer bonded to the second surface of the first foam core; and
    a plastic plate bonded to the second foam layer.

11. The foam product of claim 10, wherein the first covering and the plastic plate comprise patterns respectively.

12. The foam product of claim 8, wherein the first covering comprises patterns.

13. The foam product of claim 9, wherein the first and second coverings comprise patterns respectively.

14. A method of making a foam product comprising steps of:
    providing a mold which defines a cavity;
    providing a first covering which includes a first plastic film and a bonding film applied on a side of the first plastic film;
    placing the first covering in the cavity;
    placing at least one skin in a predetermined position on an internal side of the first covering;
    introducing suitable quantities of foam beads in the cavity;
    injecting steam into the cavity in order to have the foam beads, the first covering and the skin bonded together as a foam product; and
    removing the foam product from the cavity, wherein the foam product comprises the first covering, the skin and a foam surface.

15. The method of claim 14, comprising a step of bonding a second covering to the foam surface of the foam product.

16. The method of claim 15, wherein the first plastic film is made by steps of:
    providing a first film;
    printing patterns on the first film; and
    forming a second film on the first film to cover the patterns.

17. The method of claim 16, wherein the second covering is made by steps of:
    providing a foam layer with a density in a range of 1.5 to 12 pcf and a thickness in a range of 1 to 25 mm;
    providing a second plastic film, which comprises patterns;
    bonding a side of the second plastic film to a side of the foam layer;
    forming a plastic plate on another side of the second plastic film; and
    forming a bonding film on another side of the foam layer for bonding the foam layer to the foam surface of the foam product.

18. The method of claim 15, wherein the second covering is made by steps of:
    providing a foam layer with a density in a range of 1.5 to 12 pcf and a thickness in a range of 1 to 25 mm;
    forming a plastic plate on a side of the foam layer; and
    forming a bonding film on another side of the foam layer for bonding the foam layer to the foam surface of the foam product.

19. The method of claim 14, wherein the first plastic film is made by steps of:
    providing a first film;
    printing patterns on the first film; and
    forming a second film on the first film to cover the patterns.

* * * * *